United States Patent [19]

Magana et al.

[11] 4,210,772

[45] Jul. 1, 1980

[54] PRE-WIRED ELECTRICAL CIRCUIT BOX

[76] Inventors: Cecil L. Magana; Gary D. Spears, both of Box 248, Dewey, Okla. 74029

[21] Appl. No.: 905,728

[22] Filed: May 15, 1978

[51] Int. Cl.² ............................................. H01R 9/00
[52] U.S. Cl. ................... 174/59; 339/95 D; 339/150 T; 339/198 C
[58] Field of Search ............... 174/59, 60; 339/198 R, 339/198 C, 198 E, 150 T, 95 D

[56] References Cited

U.S. PATENT DOCUMENTS

| | | | |
|---|---|---|---|
| 2,463,033 | 3/1949 | Harnett | 174/59 X |
| 2,463,034 | 3/1949 | Harnett | 174/59 X |
| 2,533,673 | 12/1950 | Lasserre | 174/59 |
| 2,808,449 | 10/1957 | Nicholas | 174/59 |
| 2,831,914 | 4/1958 | Jacobs | 174/59 |
| 2,917,724 | 12/1959 | Jackson | 174/59 X |
| 3,393,397 | 7/1968 | Manichl | 174/59 X |
| 3,585,750 | 6/1971 | Jans | 339/95 D |
| 3,717,840 | 2/1973 | Vaughan et al. | 339/198 R |

Primary Examiner—B. A. Reynolds
Assistant Examiner—D. A. Tone
Attorney, Agent, or Firm—Head & Johnson

[57] ABSTRACT

A pre-wired electrical circuit box for structures and/or distributive wiring, comprising a circuit box made of nonconducting material, adapted to be mounted to the structure or appendage of a building. A plurality of electrical circuit boards of insulating material, assembled coaxially in parallel, spaced relation and locked in angular relation to each other. A plurality of electrical fastenings or connectors attached to each of the circuit boards at their periphery in selected, individual, angularly-spaced pattern. The fastenings on each board are connected to each other in selected manner. The spaced boards are of lesser diameter than the container box, and are inserted into the box, coaxially therewith, and fastened in fixed angular position. A plurality of small diameter openings in the wall of the circuit box are provided so that ends of wires can be cleared of insulation and inserted through appropriate openings opposite each one of the fastenings on the boards. Thus the bare electrical wire can be inserted through the opening into the corresponding fastening or connector opposite that opening. The pattern of electrical connection between the plurality of fastenings on each of the boards is based upon the particular use for which the circuit box is designed.

10 Claims, 10 Drawing Figures

PRE-WIRED ELECTRICAL CIRCUIT BOX

BACKGROUND OF THE INVENTION

1. Field of the Invention

This invention lies in the field of electrical wiring of houses and buildings. More particularly it is concerned with a prewired type of circuit box in which the particular inner connection of wires provided by the circuit boards is predetermined for a specific use. The wires that are inserted into the box are automatically connected in the proper order as soon as they are inserted into the circuit box.

2. Description of the Prior Art

In the conventional manner of electrically wiring houses and buildings, circuit boxes are provided at selected positions and wires are strung between and into the boxes. The wires in the boxes are then stripped of insulation and interconnected in selected manners. In making these interconnections, even an experienced electrician must consult a diagram in order not to make a mistake in the connections. Also considerable time is required to physically make the connections, and place them back into the connection box.

The same time consuming procedure is required when the connections must be checked or changed.

SUMMARY OF THE INVENTION

It is the primary object of this invention to provide an electrical circuit box which is prewired in particular relation to the planned use of the circuit box.

It is a further object of this invention to provide a plurality of circuit boxes each designed for a different circuit connection between power input leads, and leads to switches, fixtures and receptacles.

It is a still further object of this invention to provide a circuit box designed for interconnection of a plurality of wires, in which connection is made between a plurality of fastenings or connectors located at selected positions on each of the boards, and into which can be plugged the exposed ends of wires, by simply inserting the end of the wire through an appropriate opening in the wall of a nonconducting circuit box, the opening being positioned opposite a selected connector.

These and other objects are realized and the limitations of the prior art are overcome in this invention by providing a circuit box made of thin-walled non-conducting material such as plastic. The box can be square, circular, or other shape, and is in the form of a base with a circumferential wall. The base may have a lateral dimension, or a diameter, D and the circumferential wall a height H. Means are provided for assembling these boards of which there are nominally three, one each for the "hot wire", the "neutral wire" and the "ground wire". Each of the boards has a plurality of terminals occupied by fastenings or connectors, attached near the periphery of the boards. The diameter or dimension of the boards is a selected dimension less than the diameter D of the box, and the spacing of the parallel boards is such that when inserted into the box there will be available spaced below the bottom board for some wiring connection, such as when a lamp is to be hung from a ceiling fixture, for example. Consider the case of a ceiling connection box from which a light fixture is to hang. At least two connections must be provided from the circuit boards to connect to the light fixture. There will be three boards spaced in fixed angular position with respect to each other and the assembly of boards will be fixed inside of the box.

There are a plurality of small openings, large enough to have inserted therethrough, an insulated wire of an appropriate wire size. These openings are predetermined, and are drilled in accordance with a pattern of connection on each of the boards. The insulation on the input wires is cut from a selected distance back from the end, and the bare ends of the wires are inserted through the openings into the fastenings on the boards. Power will then be supplied to the boards. At other appropriate openings wires are inserted into the fastenings, and are connected to switches, or outlet receptacles, and so on, as may be desired and for which the boards in the box are prewired.

Another type of circuit box might be a junction box, where three conductors of large size wires are brought in at a point to each of the boards, and an appropriate number of outlet leads or wires are inserted into appropriate fastenings or connectors so that a plurality of output circuits are automatically connected to the input circuits without having to twist and fasten wires together inside of the box.

The circuit boards can be prewired in a number of ways. One way is to use an insulated board to which a sheet of copper is bonded, and which has fastenings or connectors attached to the copper, and the board, at appropriate angular positions. The copper is etched away in an acid bath, or otherwise, to provide appropriate circuit connections on each of the boards, between fastenings located at selected angles. In other words, the pattern of connection between fastenings on each of the three boards is generally different and appropriate for the kind of circuit use for which the circuit box is intended.

In another form, plain discs of insulating board can be used to which clipped fasteners are provided at selected angular positions, which can be attached to the boards by means of rivets or screws as desired. Copper wires can be connected internally between selected ones of the fastenings in a desired pattern.

In a third manner, a plain insulating board can be used with a stamped copper sheet having appropriate shape and openings which can be used to be clamped between the fastenings and the board so that electrical connections between the fastenings on each board is provided in a selected pattern, and so on.

BRIEF DESCRIPTION OF THE DRAWINGS

These and other objects and advantages of this invention and a better understanding of the principles and details of the invention will be evident from the following description, taken in conjunction with the appended drawings in which.

DESCRIPTION OF THE PREFERRED EMBODIMENT

Figure 1:
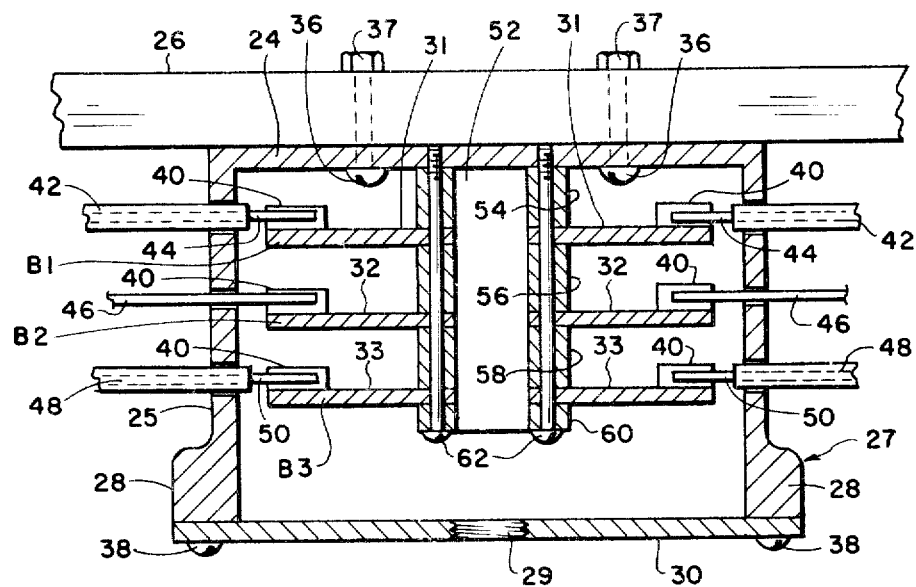
FIG. 1 illustrates in cross-section one embodiment of this invention.

Referring now to the drawings and in particular to FIG. 1 there is shown in schematic fashion one embodiment of this invention. It represents a circuit box indicated generally by the numeral 27, constructed of insulating material, and generally in the form of a square or circular base 24 having a circumferential wall 25. Bosses 28 are provided and are tapped to provide for screws 38 which serve to fasten a plate or bar 30 which is used to support a ceiling fixture or the like in the tapped opening 29. A plain cover plate can be used in place of the bar 30, as desired.

Figure 2:
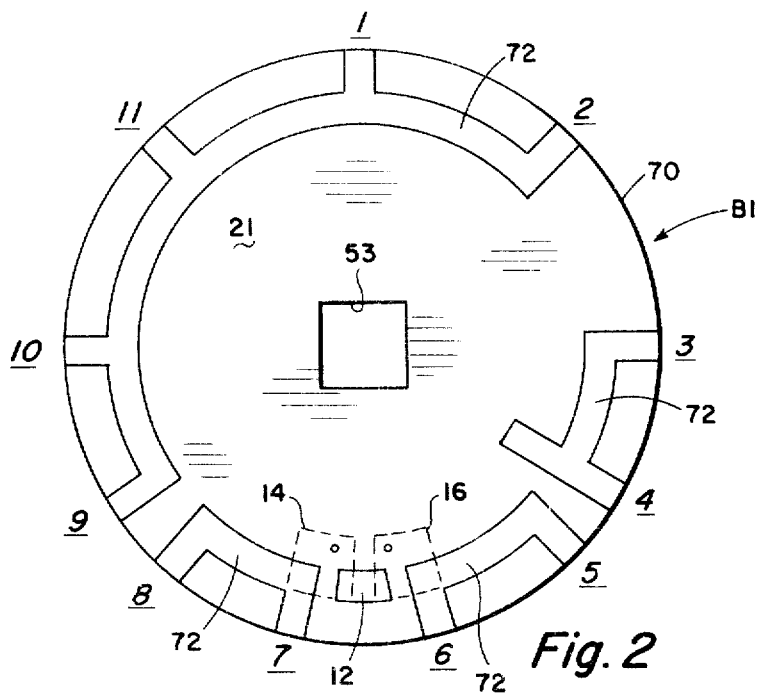
FIGS. 2, 3 and 4 illustrate selected circuit boards for use in the circuit box of FIG. 1.
Figure 3:
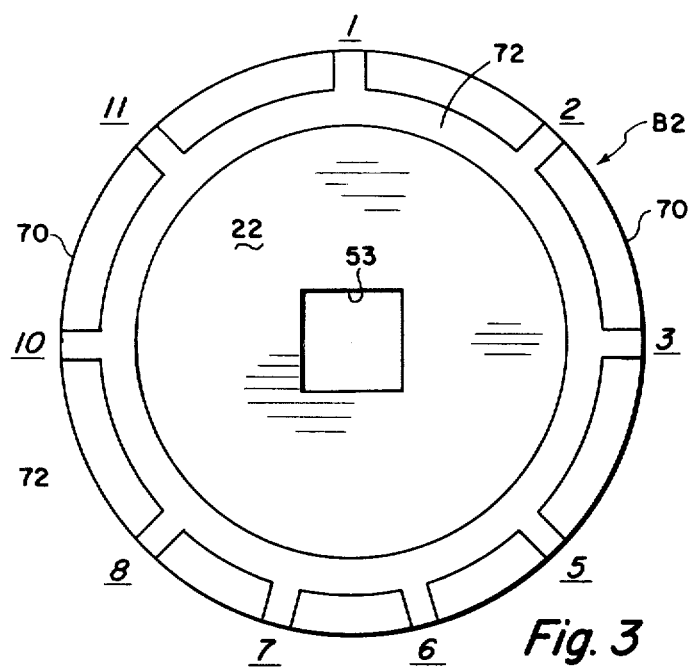
Figure 4:
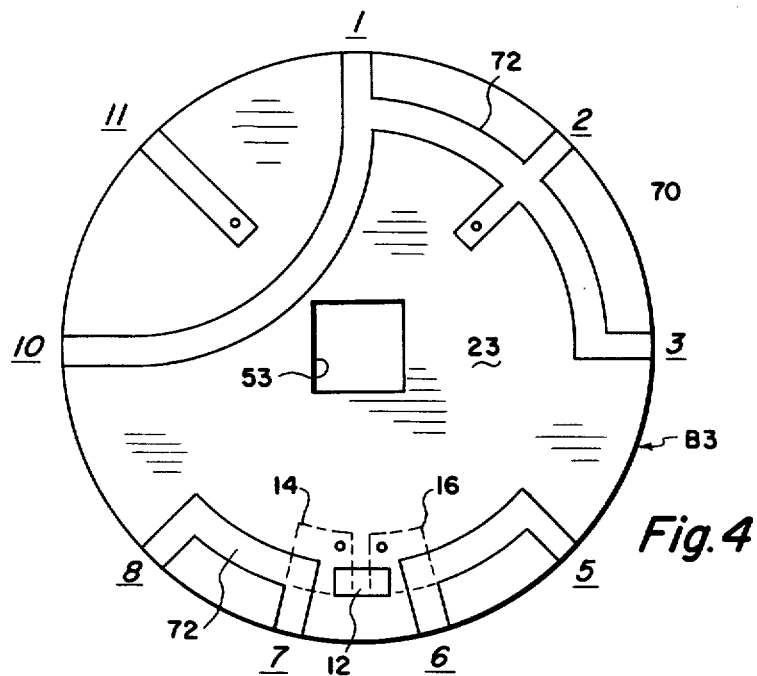

Circuit boards, such as 31, 32 and 33, are pictured separately in FIGS. 2, 3 and 4 respectively. Each of them may have a square or other shape of opening 53 so that they can be assembled over a correspondingly square post 52, for example, so that they can be held in fixed angular relation with each other.

The boards 31, 32, 33 are spaced apart from each other by insulating spacers 54, 56 and 58, each of which has a corresponding square opening like 53. These spacers 54, 56, 58, and top plate 60 are drilled, as are the boards, for two long screws 62, which penetrate through the boards and spacers into appropriate tapped holes in the base 24, so that the entire assembly is held rigidly in fixed angular relation inside of the box.

The boards 31, 32, 33 are labeled also, as B1, B2 and B3. As illustrated in FIG. 2, board B1 comprises a circular sheet of plastic material 21 with adhering copper sheet connections 72 which are provided by etching away a complete copper cover in a selected manner. This procedure is well known in the art.

For convenience, a number of connection terminals indicated as 1, 2, 3, 4, 5, 6, 7, 8, 9, 10 and 11 are spaced in selected angular locations. Corresponding positions are provided on the board B2 of FIG. 3 and board B3 of FIG. 4. These may not all have terminals at the same positions, but whatever terminals they have, according to their number, are at the precise angular position. In the assembly of the boards as shown in FIG. 1 the numeral 1 position on each of the three boards would be in vertical alignment and correspondingly the others, which are shown. It is seen that board number B3 in FIG. 4 does not have terminals at positions 9 or 4 nor does board B2 of FIG. 3.

Referring back to FIG. 1, there is shown along the periphery of the boards fasteners or connectors, indicated by the numeral 40. These can be any type of electrical connector in which a wire can be inserted through the wall 25 of the circuit box to make connection.

Figure 7:
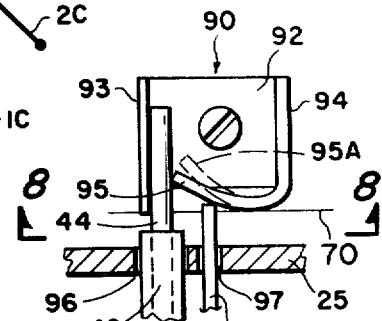
FIGS. 7 and 8 illustrate two views of one type of fastening or connector that might be attached to the circuit board.
Figure 8:
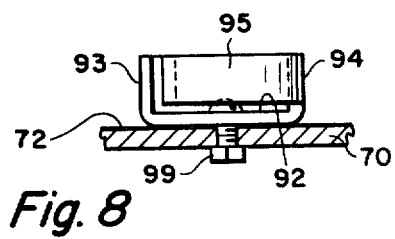

One possible form of such a connector is shown in FIGS. 7 and 8 to which reference is now made. FIG. 7 illustrates a plan view of one type of connector which is similar to a type available on the market. The connector is indicated generally by the numeral 90, and consists of a flat base 92 with one bent up sidewall 93, another bent up sidewall 94, carrying a projection 95, which is bent into a curved cross position as shown. This material is of sufficient springyness so that the projection 95, when pressed inwardly moves to the angular position shown in dashed outline 95A. The line 70 illustrates the circumferential edge of the circuit board with a connector mounted substantially flush with the edge.

The wall 25 shown in cross-section, illustrates the wall of the circuit box. There are two openings through the wall, 96 which is a circular opening, large enough to pass the insulated wire 42. The insulation has been removed over the end portion of the wire, so that as the wire is inserted through the opening 96, the bare portion 44 passes between the wall 93 and the end of the part 95. Thus, a piece of insulated wire can be prepared and inserted through an opening in the outside wall of the circuit box, to make connection to a spring clip terminal connector. The connector is attached to the board 70 by means of a screw 99, rivet, or equivalent. If connections have to be withdrawn, or remade, the wire is withdrawn by inserting a tool 98 into the opening 97 and by pressing the spring portion 95, the conductor wire is released. The sharp edge at the end of the spring portion 95, moves to the position 95A at which time the wire 42 can be withdrawn.

As shown in FIG. 1, the connection box 27 can be mounted by means of screws 36 and nuts 37 to a support bar 26 which is itself attached between the ceiling joists, or other structure of the wall or ceiling.

Figure 6:
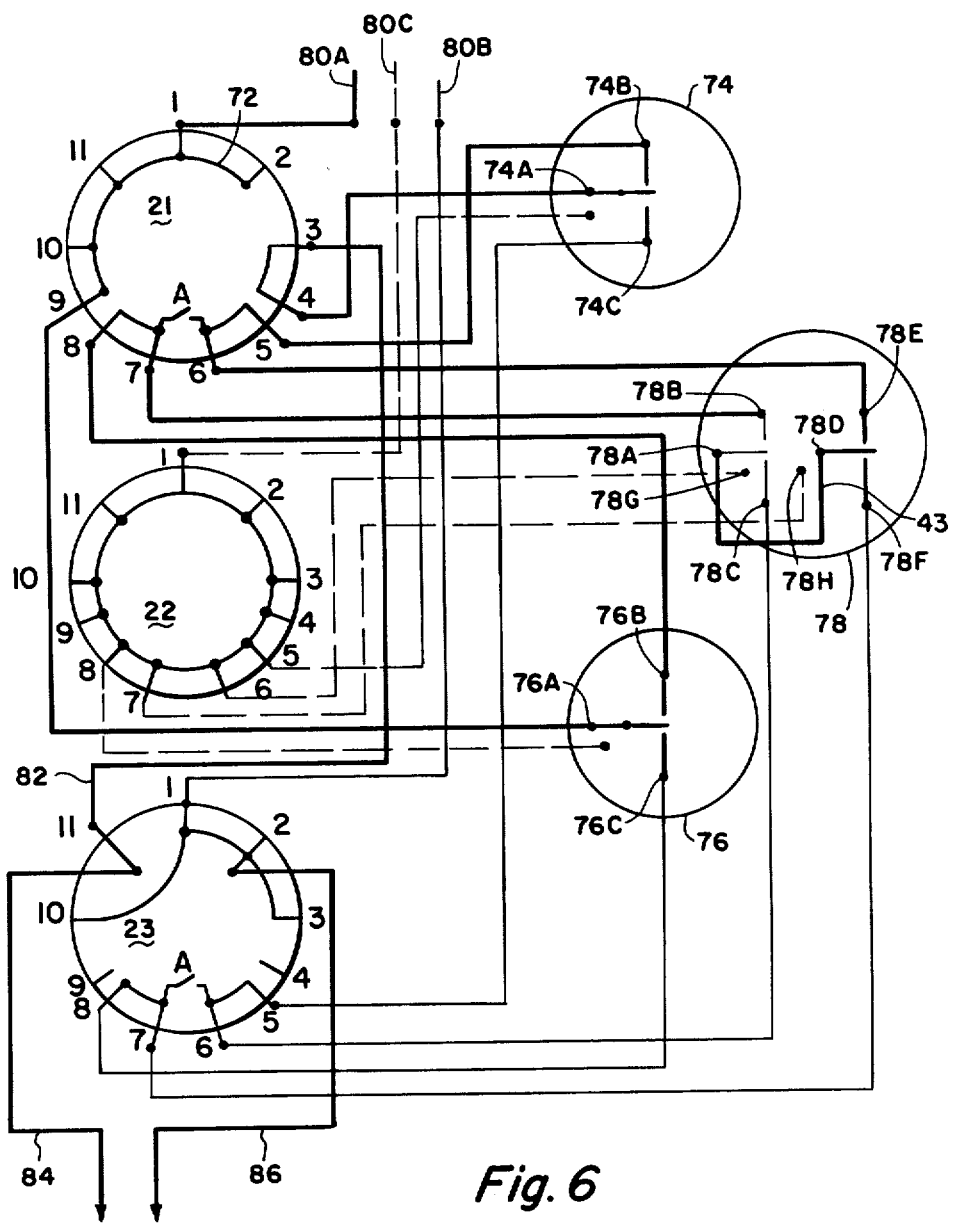
FIG. 6 illustrates the circuit board connections and the switches that might be used in a three switch connection to a ceiling fixture.

Referring now to FIG. 6, there is illustrated a group of three boards, 21, 22, and 23, to which three entering power wires 80A, 80B and 80C are connected in the manner shown in FIG. 1. Also two switches of the single pole double throw type 74 and 76 are provided, for a two switch connection to a ceiling fixture, which would be attached to leads 84 and 86, from the appropriate contacts of the circuit board.

Also provided is a double pole double throw switch 78 which would be used as a third independent switch for control of the power to the ceiling fixture attached to leads 84, 86.

The individual boards 21, 22 and 23 are wired substantially in accordance with FIGS. 2, 3 and 4 with the addition of a switch or contact A, which is shown on both boards 21 and 23. The contacts A are required only for the third switch 78. With the switches A closed then the third switch 78 is shorted out and has no effect on the power connection to the ceiling fixture on leads 84, 86.

Entering "hot" power lead 80A goes to terminal 1 on board 21. "Neutral" lead 80B goes to terminal 1 on board number 23, and the ground wire 80C goes to terminal 1 on board 22. In board 21, power goes internally from terminal 1 to terminal 9, and then to the terminal 76A of switch 76. One contact 76B goes to terminal 8 of board 21, and through the switch A to terminal 5, and then to the switch terminal 74B of switch 74. Corresponding terminal 74C of switch 74 goes to terminal 5 of board 23, through the closed switch A to terminal 8 and then back to terminal 76C of switch 76. The switch contact 74A of switch 74 goes to terminal 4 of board 21 and then to terminal 3. Then by wire 82 it goes to terminal 11 of board 23. Lead 84 goes to terminal 11, and lead 86 goes to terminal 2 of the board 23. These leads then go to a ceiling fixture, or other apparatus which is to be controlled independently by the two switches 74 and 76.

By proper marking and/or color coding of the openings on the wall 25 of the circuit box, all guess work, calculation and figuring, as to which wire goes to which, becomes unnecessary, and the box and switches can be connected very rapidly into the particular connection for which the box was designed. A different application requires a different circuit box, having different circuit boards, which would be appropriate to the application.

Figure 5:
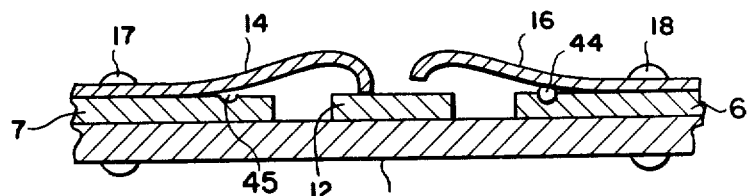
FIG. 5 illustrates a type of connector that might be used in conjunction with the circuit boards of FIGS. 2, 3, and 4.

The switches A on boards 21 and 23 are indicated schematically in FIG. 2 in dashed outline as elements 14 and 16, and similarly in FIG. 4. One possible construction of these switches is illustrated in FIG. 5. There is an intermediate copper contact 12 attached to the board 70 between terminals 6 and 7. There are spring clips 14 and 16 which bridge from the terminals 7 and 6 respectively. Normally, terminal 6 is connected by spring member 16 to contact 12, which is connected by spring member 14 to terminal 7. In this condition the switch A is closed. However, when a wire 44 is inserted into the groove 45, it lifts the spring member 16 and breaks contact from the spring member to the terminal 12, and opens half of the switch. A similar conductor 44 inserted into the groove 45 under spring clip 14 would then lift the spring clip 14 in the same manner that the spring clip 16 is lifted. In that condition the switch A is fully open.

It will be seen from FIG. 6 that terminals 6 and 7 of board 21 are connected to the contacts 78B and 78E of switch 78. Similarly the contacts 7 and 6 of board 23 are connected to the contact 78C and 78F. The switch terminals 78A and 78D are connected by wire 43. Thus, by inserting the wires leading to terminals 6 and 7 into the appropriate grooves 45, the circuit of switch A is open which connects into the switch control circuit, the third switch 78. This provides three independent locations where the power to the ceiling fixture by wires 84 and 86 can be controlled.

It will be clear therefore that because of the pre-wiring which is provided in the circuit boards, such a complicated circuit as that illustrated in FIG. 6 can be wired with little more time than it takes to remove the insulation from the tips of the wires and, following the color coding, to insert them in the proper openings 96 in the walls of the circuit box.

Figure 9:
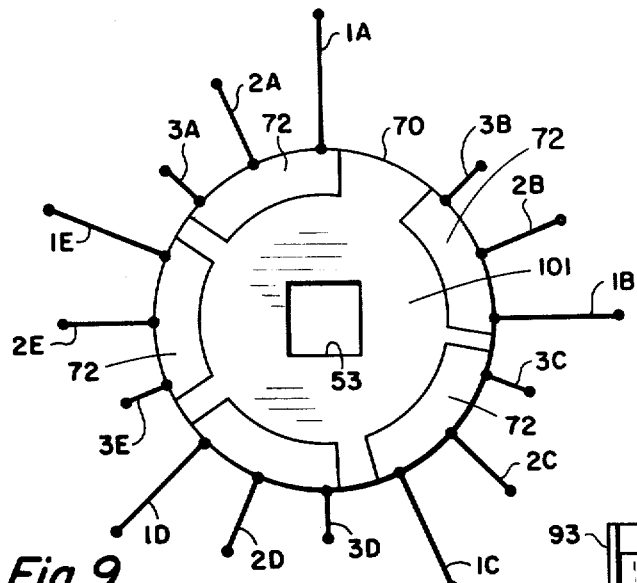
FIGS. 9 and 10 illustrate the electrical connection to a type of circuit board for use as a junction box.
Figure 10:
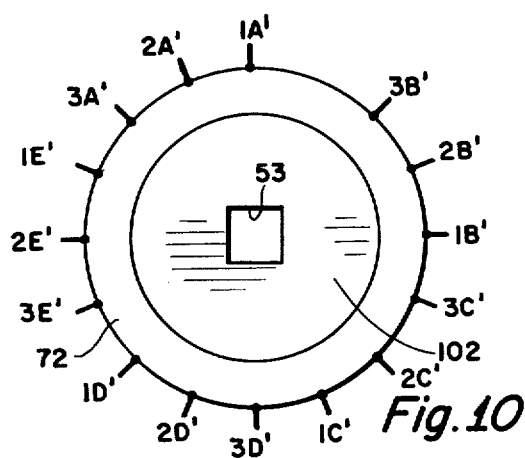

In FIGS. 9 and 10, there are illustrated additional circuit boards 101 and 102. Circuit board 101 is designed as the hot lead circuit board, and the neutral circuit board. Circuit board 102 is the ground circuit board for ground connection. The objective of this junction box is to provide one or a plurality of input leads such as 1A, 1B, 1C, 1D, 1E etc. which can be independent circuits. The neutral circuit board, which would be identical to that of the hot lead of board 1, namely 101, is identical to 101, and is not further illustrated. The ground board is shown as 102 in which all terminals are connected together by the copper layer 72.

In use, one circuit would comprise the input lead 1A on board 101 and there would be as shown two output circuits 2A and 3A. Similarly, the neutral board would have the same pattern as board 101. There would be an input lead in position 1A and two output leads in position 2A and 3A. The connection is similar for each of the other circuits, B, C, D and E.

While we have shown two typical types of circuit board connections illustrating two very common types of circuit boxes, it will be clear that the principles of this invention can be utilized in many other combinations of wire connections, with a consequent great saving in effort and time in providing the corresponding interconnections between the various wires by twisting and capping, or soldering, or whatever. The advantage of this type of circuit board connection is that where there are many interconnected wires from a plurality of switches, a plurality of outlets, and ceiling fixtures, etc.

In FIG. 6, there are no connections shown to electrical outlet boxes. These could, for example, be connected to terminals 2 and/or 10, on each of the three boards 21, 22 and 23. These would be "hot" all the time. If it was desired that they be connected through a switch then the outlet receptacles could be connected for example to the terminals 3 on each of the three boards. Thus many different combinations are possible under the design illustrated in the figures.

While the circuit boards and circuit box are shown as circular, it will be clear that they can be square, or any other desired shape. And, of course, the positions of the fastenings or connectors will be different, as well as their internal connections.

While the invention has been described with a certain degree of particularlity, it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:
1. A prewired electrical circuit box comprising:
   (a) a circuit box made of thin walled non-conducting material, having a base of lateral dimension D and a circumferential wall of height H, and means to mount said circuit box to a structure;
   (b) a plurality of electrical circuit boards of shape similar to that of said box, and of dimension less than D, assembled co-axially, in parallel spaced relation, and locked in angular relation to each other,
   (c) a plurality of electrical fastenings attached to each of said circuit boards at their periphery, in selected individual angularly-spaced pattern, said fastenings on each board connected together electrically in selected patterns which are different on at least two boards.
   (d) means to mount said assembly of circuit boards in said circuit box in a fixed angular position;
   (e) a plurality of small diameter openings in the wall of said circuit box, each of said openings positioned opposite one of said fastenings on said boards, so that a bare electrical wire of selected diameter can be inserted through an opening into the corresponding fastening opposite that opening; and
   (f) means to attach and detach each wire to and from said fastening in which it is inserted;
      whereby a plurality of electrical wires can be inserted into selected ones of said plurality of openings, and be connected to each other in a preselected manner.

2. The circuit box as in claim 1 in which the wall of said box is substantially circular, of diameter D, and said circuit boards are circular, of diameter less than D.

3. The circuit box as in claim 1 in which the number of said circuit boards assembled together is three of which one is different from at least one of the others.

4. The circuit box as in claim 3 in which said plurality of electrical wires comprises three wires, a first "hot" wire, a second "neutral" wire, and a third bare ground wire, and all "hot" wires are connected to a first board, all ground wires are connected to a second board, and all "neutral" wires are connected to a third board.

5. The circuit box as in claim 1 in which each of said circuit boards comprises a sheet of insulating material with a bonded layer of copper attached, at least to one surface.

6. The circuit box as in claim 5 in which said fastening is attached to said bonded copper layer.

7. The circuit box as in claim 1 in which each of said circuit boards comprises a sheet of insulating material, and a preformed sheet of copper, which is attached to one surface of said board by said fastenings.

8. The circuit box as in claim 1 in which each of said fastenings comprises a spring clip attached to said board, and into which said wire can be inserted and held, and from which said wire can be released by means of a tool inserted into a second opening adjacent the opening into which said wire is inserted.

9. The circuit box as in claim 1 in which said box is a junction box, and in which:

(a) a first board has at least two separate input fastenings, each one connected to at least two output fastenings;
(b) a second board having at least one separate input fastening connected to at least two output fastenings; and
(c) a third board having a plurality of fastenings all connected together.

10. The circuit box as in claim 1 including a contact means on at least one circuit board comprising;
(a) a first terminal spaced apart from an insulated second terminal;
(b) a first spring clip attached to said first terminal making contact to said second terminal;
(c) means to insert a bare wire between said first terminal and said first spring clip;
whereby when said wire is inserted, said spring clip is lifted, and electrical contact between said first terminal, through said first spring clip to said second terminal is broken.

* * * * *